United States Patent
Yoshida

(10) Patent No.: US 8,453,002 B2
(45) Date of Patent: May 28, 2013

(54) APPARATUS AND METHOD FOR CONTROLLING POWER STATE TRANSITIONS BASED ON TIMER EVENTS

(75) Inventor: Hideki Yoshida, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/219,332

(22) Filed: Aug. 26, 2011

(65) Prior Publication Data

US 2012/0137155 A1    May 31, 2012

(30) Foreign Application Priority Data

Nov. 26, 2010    (JP) .................. 2010-263980

(51) Int. Cl.
| G06F 1/00 | (2006.01) |
| G06F 1/26 | (2006.01) |
| G06F 1/32 | (2006.01) |
| G06F 9/44 | (2006.01) |
| G06F 13/24 | (2006.01) |

(52) U.S. Cl.
USPC ........... 713/323; 713/300; 713/320; 719/318; 710/260

(58) Field of Classification Search
None
See application file for complete search history.

(56) References Cited

U.S. PATENT DOCUMENTS

| 5,845,137 | A | 12/1998 | Tanaka | |
| 6,189,106 | B1 * | 2/2001 | Anderson | 713/300 |
| 6,366,768 | B1 * | 4/2002 | Tessier et al. | 455/260 |
| 6,744,888 | B1 * | 6/2004 | El-Kik et al. | 379/412 |
| 7,007,180 | B2 * | 2/2006 | Hashimoto | 713/320 |
| 7,752,481 | B2 | 7/2010 | Morisawa | |
| 7,996,694 | B2 * | 8/2011 | Bold et al. | 713/320 |
| 8,020,016 | B2 | 9/2011 | Hatasaki et al. | |
| 8,020,025 | B2 * | 9/2011 | Hyatt | 713/502 |
| 2003/0105983 | A1 * | 6/2003 | Brakmo et al. | 713/320 |
| 2007/0101171 | A1 | 5/2007 | Morisawa | |
| 2008/0098245 | A1 * | 4/2008 | Hogan et al. | 713/323 |
| 2008/0294920 | A1 | 11/2008 | Hatasaki et al. | |
| 2011/0307728 | A1 | 12/2011 | Hatasaki et al. | |

FOREIGN PATENT DOCUMENTS

| JP | 08-234874 | 9/1996 |
| JP | 2001-005550 | 1/2001 |
| JP | 2007-011494 | 1/2007 |
| JP | 2007-122566 | 5/2007 |
| JP | 2008-287644 | 11/2008 |
| JP | 2010-063090 | 3/2010 |

* cited by examiner

*Primary Examiner* — Ji H Bae
(74) *Attorney, Agent, or Firm* — Knobbe, Martens Olson & Bear LLP

(57) ABSTRACT

According to one embodiment, an electronic apparatus includes a first power saver, a second power saver and a controller. The first power saver executes switching from an operable condition to a first power saving state. The second power saver executes switching from the first state to a second state in which power consumption is smaller than that in the first state. The controller determines whether timer event processing executable in the first state is scheduled within a predetermined period of time when the switching from the operable condition to the second state is required, and controls the first power saver and the second power saver so as to execute switching to the first state and maintains the first state without switching to the second state, when the timer event processing is scheduled within the predetermined period of time.

13 Claims, 5 Drawing Sheets

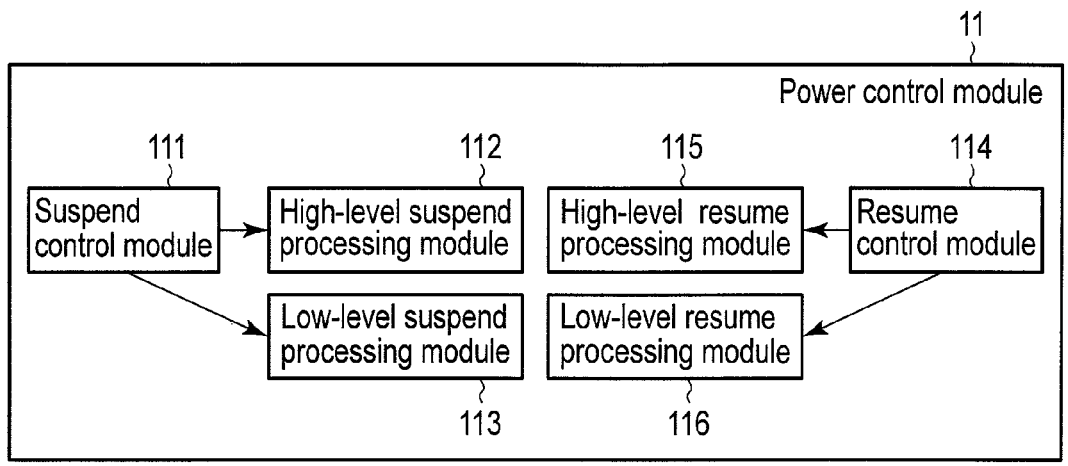
F I G. 3
| a1 | a2 | a3 |
|---|---|---|
| Schedule time | Kind of timer event | Content of timer event |
| 12:34:56.789 | High level | Application processing by application A |
| 12:36:01.234 | Low level | Driver processing by device D |
F I G. 4

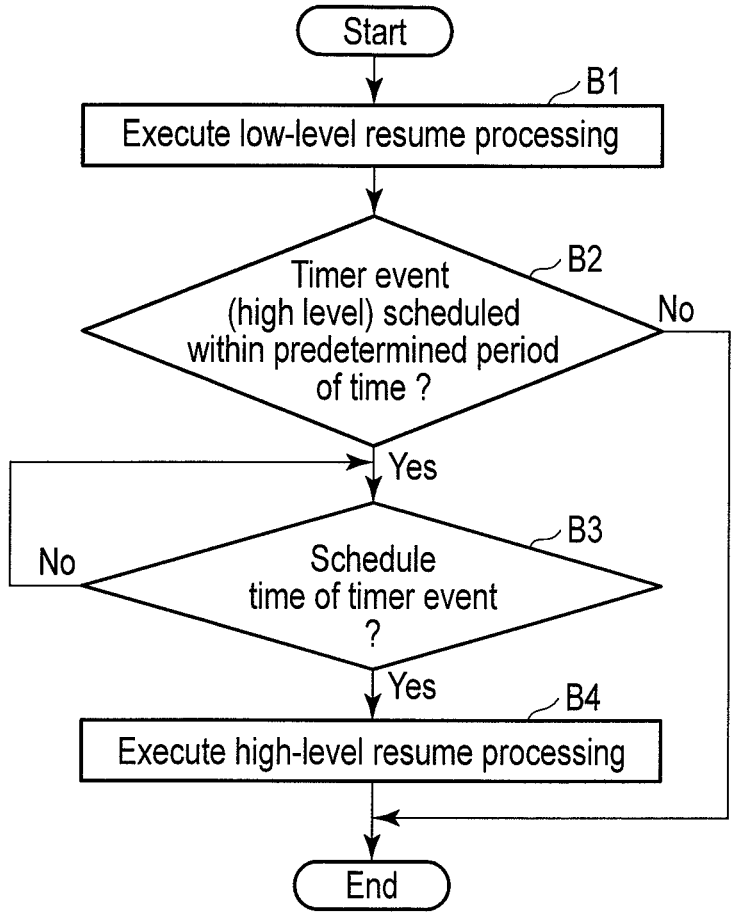
F I G. 8

APPARATUS AND METHOD FOR CONTROLLING POWER STATE TRANSITIONS BASED ON TIMER EVENTS

CROSS-REFERENCE TO RELATED APPLICATIONS

This application is based upon and claims the benefit of priority from Japanese Patent Application No. 2010-263980, filed Nov. 26, 2010; the entire contents of which are incorporated herein by reference.

FIELD

Embodiments described herein relate generally to electronic apparatuses such as mobile phones and personal digital assistants, and a power saving control method for electronic apparatuses.

BACKGROUND

In recent years, easily portable and battery-driven apparatuses are in wide use. Some portable apparatuses that are installed with an operating system (OS) are automatically suspended for power saving, when there is no task to do, and are automatically resumed when some task arises thereafter. The "suspend" and "resume" are functions designed to save power without lowering the uses' work efficiency. In the "suspend" processing, the portable apparatuses are suspended, with the states being maintained, and in the "resume" processing, the suspended portable apparatuses are returned to the original states in which they were immediately before the "suspend" processing.

The "suspend" processing and "resume" processing are controlled by the OS, which manages resources of a portable apparatus, and various proposals have been made to enhance the efficiency of the "suspend" processing and "resume" processing.

The power consumption of a portable apparatus can be reduced when the apparatus is in the suspend mode. It should be noted, however, that the suspend processing and the resume processing consume the power (of the battery of the portable apparatus). Therefore, frequent use of the suspend processing and resume processing should be avoided.

Up until now, little attention has been paid to the fact that the suspend processing and the resume processing do require power, and few effective methods for avoiding frequent use of the suspend processing and the resume processing have been considered.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram illustrating the functions of a power control module of the electronic apparatus of the embodiment.

FIG. 4 is an exemplary diagram illustrating an example of the storage contents of a timer list of a kernel, which operates on the electronic apparatus of the embodiment.

FIG. 8 is an exemplary flowchart illustrating an example of how the resume processing of the electronic apparatus of the embodiment is executed.

DETAILED DESCRIPTION

Various embodiments will be described hereinafter with reference to the accompanying drawings.

In general, according to one embodiment, an electronic apparatus includes a first power saver, a second power saver and a controller. The first power saver is configured to execute switching from an operable condition to a first power saving state. The second power saver is configured to execute switching from the first power saving state to a second power saving state in which power consumption is smaller than that in the first power saving state. The controller is configured to determine whether timer event processing executable in the first power saving state is scheduled within a predetermined period of time when the switching from the operable condition to the second power saving state is required, and to control the first power saver and the second power saver so as to execute switching to the first power saving state and maintain the first power saving state without switching to the second power saving state, when the timer event processing is scheduled within the predetermined period of time.

Figure 1:
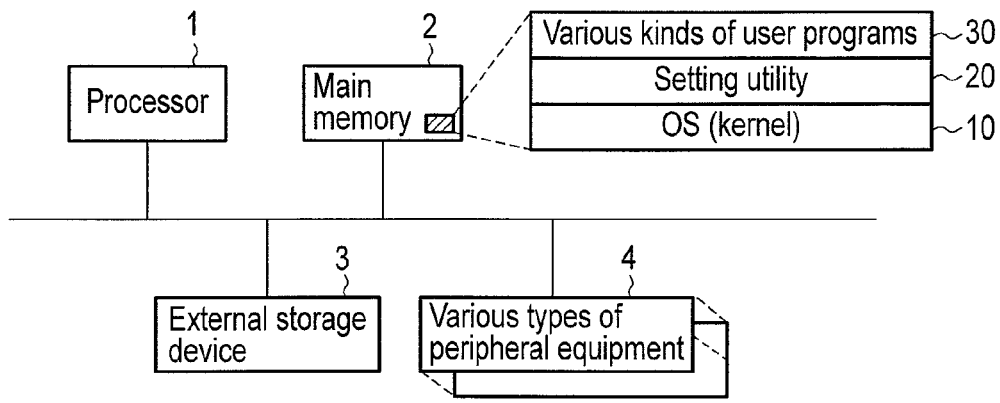
FIG. 1 is an exemplary block diagram schematically illustrating an electronic apparatus according to an embodiment.

FIG. 1 is an exemplary block diagram schematically illustrating an electronic apparatus according to an embodiment. The electronic apparatus is realized as a OS-preinstalled low-power computer, such as a mobile personal computer (PC) or a multifunction portable telephone generally referred to as a smartphone. The electronic apparatus includes a power saving function that enables execution of suspend processing and resume processing at proper times under the control of the installed OS. The electronic apparatus of the embodiment is not limited to the mobile PC, smartphone, or other types of low-power computer, and may be realized as a consumer electronics apparatus (such as a television receiver) or a control computer.

As shown in FIG. 1, the subject electronic apparatus includes a processor 1, a main memory 2, an external storage device 3 and various types of peripheral equipment 4.

The processor 1 is a processing unit configured to loads a program into the main memory 2 from the external storage device 3 and to permit the subject electronic apparatus to operate based on the descriptions in the program. The programs executed by the processor 1 include an OS (kernel) 10, and a setting utility 20, various kinds of user programs 30, etc., operating under the control of the OS 10 (the setting utility 20 will be described later).

The main memory is a volatile storage medium configured to temporarily store a program which is being executed by the processor 1, and data input or output by the program. The external storage device 3 is a nonvolatile storage medium used as an auxiliary device of the main memory 2 and configured to permanently store programs and data in large amounts. Exchange of part of the content (which is generally referred to as swap) is executed between the main memory 2 and the external storage device 3, when required.

The various types of peripheral equipment 4 include a keyboard and a pointing device which receive data inputs from the user, a display which outputs an image to the user, a speaker which outputs an audio to the user, a wireless communication module which provides a wireless communication function, etc.

Figure 2:
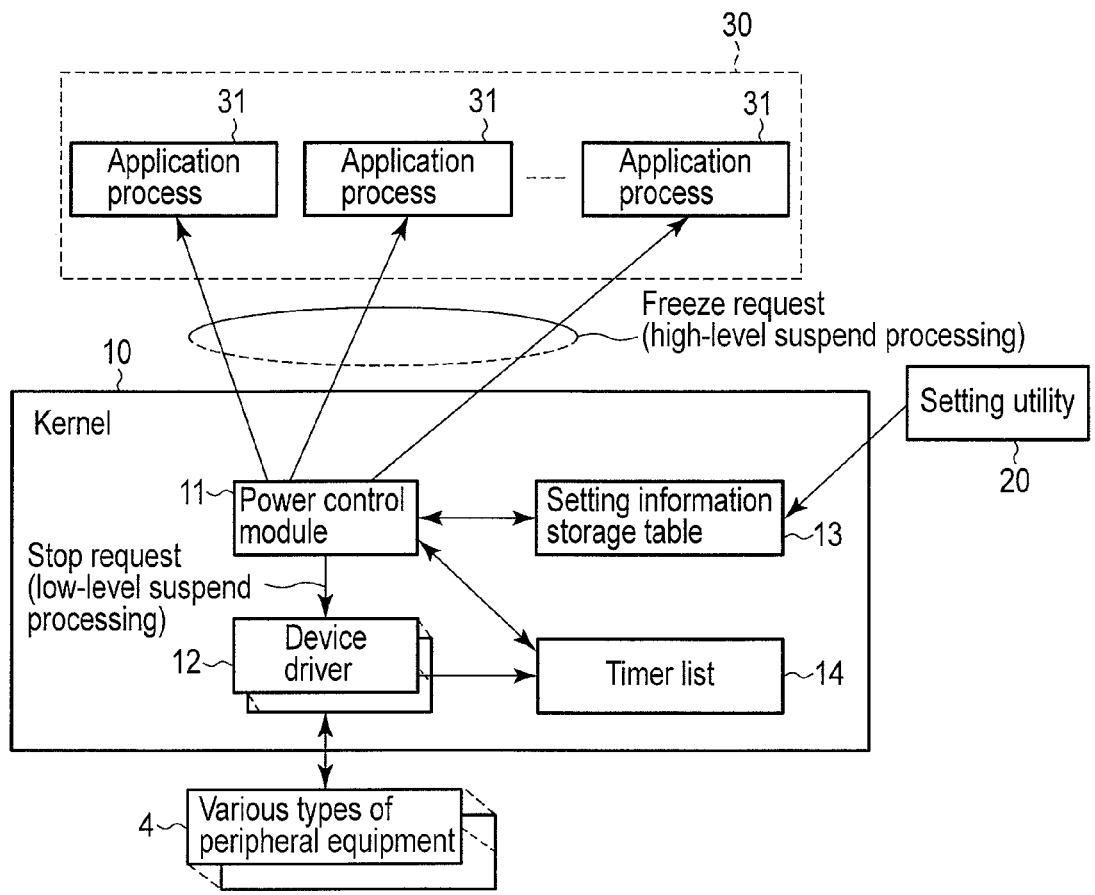
FIG. 2 is an exemplary block diagram illustrating the functions of the suspend processing and resume processing of the electronic apparatus of the embodiment.

FIG. 2 is an exemplary block diagram illustrating the functions of the suspend processing and resume processing of the electronic apparatus of the embodiment.

In many cases, the suspend processing and the resume processing are executed inside the kernel, but part of the processing may be executed outside the kernel, for example, by a program generally referred to as a demon. In the present specification, reference will be made only to the major portions of the suspend processing and resume processing that are executed inside the kernel, for the sake of simplicity.

In the subject electronic apparatus, each of the suspend processing and resume processing is regarded as being constituted by high-level processing and low-level processing. More specifically, the suspend processing is executed in two stages: high-level suspend processing and low-level suspend processing; likewise, the resume processing is executed in two stages: low-level resume processing and high-level resume processing. In this specification, the state where only the high-level suspend processing is executed from the operable condition, and the state where only the low-level resume processing is executed from the stationary state (which is the state after the low-level suspend processing is executed) will be referred to as a half-suspended state or half-resumed state. As can be seen from this, the half-suspended state and the half-resumed state are intended to refer to the same state. In this specification, the stationary state obtained after the low-level suspend processing will be referred to as totally-suspended state. A power control module 11 is a program that executes the two stages of suspend processing and the two stages of resume processing.

In general, the suspend processing and the resume processing are executed in the following two stages: high-level processing pertaining to software; and low-level processing pertaining to hardware. At the time of suspend, the kernel 10 freezes the application processes 31 of currently-running user programs 30 as high-level suspend processing in the first stage, and halts the peripheral equipment 4 as low-level suspend processing in the second stage. At the time of resume, the kernel 10 resumes the peripheral equipment 4 as low-level resume processing in the first stage, and releases the frozen state of the application processes 31 as high-level resume processing in the second stage.

The suspended electronic apparatus is resumed in response to application processing or interrupt processing. Many kinds of interrupt processing do not have to be based on application and can be executed by the kernel alone. In other words, such kinds of interrupt processing can be executed in the half-suspended state, which is a state after the high-level suspend processing is executed. In the present embodiment, therefore, each of the suspend processing and resume processing is divided into two, namely, high-level processing and low-level processing.

The processing pertaining to software need not be defined as high-level processing, and likewise the processing pertaining to hardware need not be defined as low-level processing. Provided that there is a state where part of the processing enabling the start of resume can be executed (other than the state where the software is frozen), such a state may be defined as a half-suspended state, and how to define the high-level processing and the low-level processing can be defined, accordingly. Regardless of how the high-level processing and low-level processing are defined, the power consumption is smaller in the totally-suspended state (a second power saving state) than in the half-suspended state (a first power saving state).

FIG. 3 is an exemplary block diagram illustrating the functions of a power control module 11.

As shown in FIG. 3, the power control module 11 includes a suspend control module 111, a high-level suspend processing module 112, a low-level suspend processing module 113, a resume control module 114, an high-level resume processing module 115, and a low-level resume processing module 116.

The high-level suspend processing module 112 is a program that executes the high-level suspend processing, and the low-level suspend processing module 113 is a program that executes the low-level suspend processing. The suspend control module 111 is a program that controls the high-level suspend processing module 112 and the low-level suspend processing module 113, for two-stage suspend processing.

The high-level resume processing module 115 is a program that executes the high-level resume processing, and the low-level resume processing 116 is a program that executes the low-level resume processing. The resume control module 114 is a program that controls the high-level resume processing module 115 and the low-level resume processing 116, for two-stage resume processing.

The application processing and interrupt processing in response to which the suspended electronic apparatus is resumed, can be classified as processing that cannot be scheduled due to some external factor and processing that can be scheduled beforehand. An example of the latter processing is patrol processing which a device driver 12 executes for monitoring a device regularly (the device is one of the peripheral equipment 4). This kind of processing is referred to as a timer event. A schedule time of the timer event is stored in the timer list 14 of the kernel 10. FIG. 4 is an exemplary diagram illustrating an example of the storage contents of the timer list 14 of the kernel 10.

As shown in FIG. 4, the timer list 14 stores a schedule time (field "a1"), a kind (field "a2") and content (field "a3") for each timer event. The "high level" and "low level" stored in field "a2" are information used for determining whether the corresponding timer event should be carried out even in the half-suspended state. Like a periodic interrupt, a timer event indicated as "low level" can be executed even in the suspended state.

To suspend the subject electronic apparatus in response to the termination of application processing, the suspend control module 111 of the power control module 11 refers to the timer list 14 and determines whether a timer event of the "low level" is to be executed within a predetermined period of time. If the timer event of the "low level" is to be executed within the predetermined period of time, only the high-level suspend processing based on the high-level suspend processing module 112 is executed, and the subject electronic apparatus is kept in the half-suspended state.

Figure 5:
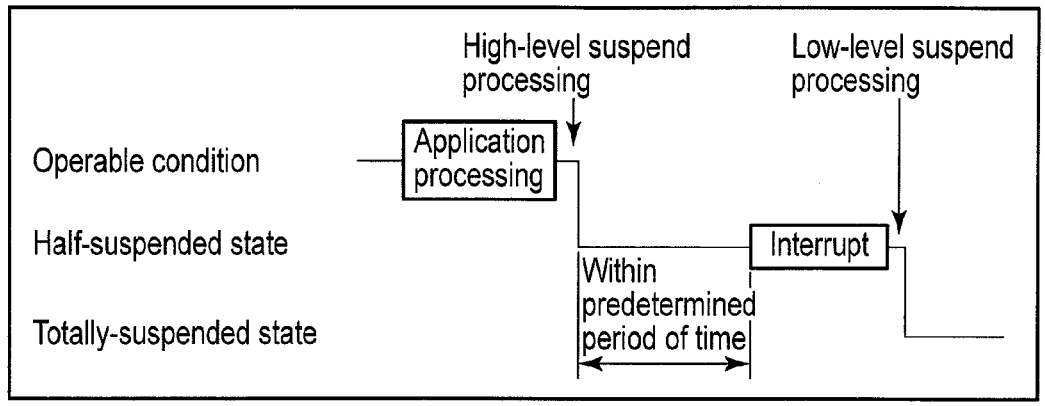
FIG. 5 is an exemplary timing chart illustrating an example of a suspend processing procedure of the electronic apparatus of the embodiment.

When the schedule time stored in the timer list 14 comes and the timer event of "low level" is terminated, the suspend control module 111 carries out only the low-level suspend processing based on the low-level suspend processing module 113, and the subject electronic apparatus is switched into the totally-suspended state. FIG. 5 is an exemplary timing chart illustrating how the suspend processing procedure is performed by the electronic apparatus in this case.

In the case shown in FIG. 5, the ordinary suspend procedure performs the suspend processing for switching to the totally-suspended state, when the application processing has just been terminated. At the time of interrupt processing, the resume processing (for switching to an operable condition) is carried out to set the electronic apparatus in the operable condition, and the suspend processing is carried out once again at the end of the interrupt processing. As can be seen, in a short period of time, the suspend processing is executed twice and the resume processing is executed once.

To reduce the load, it may be possible to keep the subject electronic apparatus in the operable condition without executing the suspend processing at the end of the application processing. However, maintaining the operable condition consumes a large amount of power, which may be a problem in some cases. In contrast, in the case shown in FIG. 5, the subject apparatus keeps the half-suspended state, as described above. This procedure contributes not only to the power saving but also to the load reduction because each of the high-level suspend processing and the low-level suspend processing, which jointly correspond to one-time suspend processing of the ordinary suspend procedure, is executed only once.

As described above, when the subject electronic apparatus is suspended, the suspend control module 111 of the power control module 11 checks whether a timer event of the "low level" is to be executed within a predetermined period of time. Information on the "predetermined period of time" is obtained from a setting information storage table 13 shown in FIG. 2. The setting utility 20 is a man-machine interface program prepared for setting the values in the setting information storage table 13. By use of a graphical user interface (GUI) screen provided by the setting utility 20, the function of maintaining the half-suspended state can be enabled or disabled.

When an event that has to be executed in the half-suspended state is generated in the totally-suspended state, the resume control module 114 of the power control module 11 executes only the low-level resume processing based on the low-level resume processing module 116, and switches the subject electronic apparatus to the half-suspended state. In this case, the resume control module 114 refers to the timer list 14 to check whether a timer event of "high level" is to be executed within a predetermined period of time.

If the checks shows that the timer event of "high level" is to be executed within the predetermined period of time, the resume control module 114 keeps the subject electronic apparatus in the half-suspended state even after the processing for the event, which caused the subject electronic apparatus to be switched to the half-suspended state, is terminated.

Figure 6:
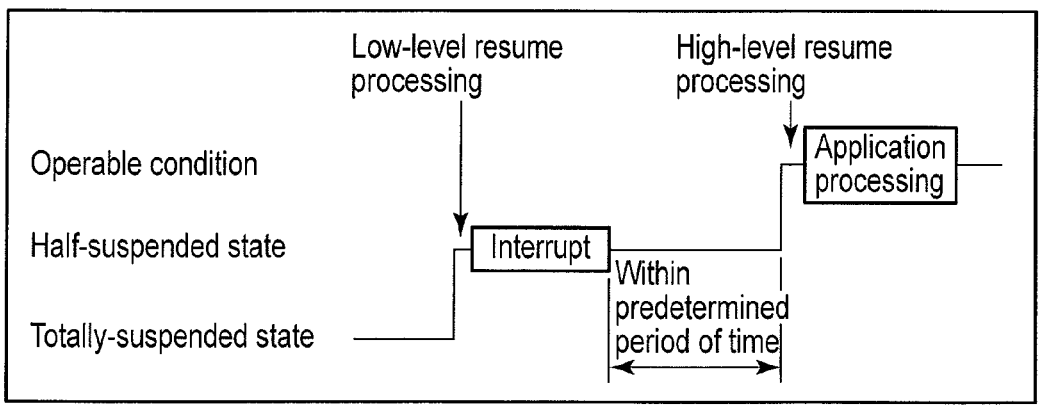
FIG. 6 is an exemplary timing chart illustrating an example of a resume processing procedure of the electronic apparatus of the embodiment.

Thereafter, when the schedule time stored in the timer list 14 comes, the resume control module 114 executes the high-level resume processing based on the high-level resume processing module 115, thereby returning the subject electronic apparatus to the operable condition. FIG. 6 is an exemplary timing chart illustrating how the resume processing procedure is performed by the electronic apparatus in this case.

In the case shown in FIG. 6, the ordinary resume procedure performs the resume processing to execute the interrupt processing, and performs the suspend processing at the end of the interrupt processing. When the application processing is executed, the resume processing is carried out once again. As can be seen, in a short period of time, the resume processing is executed twice and the suspend processing is executed once.

To reduce the load, it may be possible to keep the subject electronic apparatus in the operable condition without executing the suspend processing at the end of the interrupt processing. However, maintaining the operable condition consumes a large amount of power, which may be a problem in some cases. In contrast, in the case shown in FIG. 6, the subject apparatus keeps the half-suspended state, as described above. This procedure contributes not only to the power saving but also to the load reduction because each of the high-level resume processing and the low-level resume processing, which jointly correspond to one-time resume processing of the normal resume procedure, is executed only once.

Figure 7:
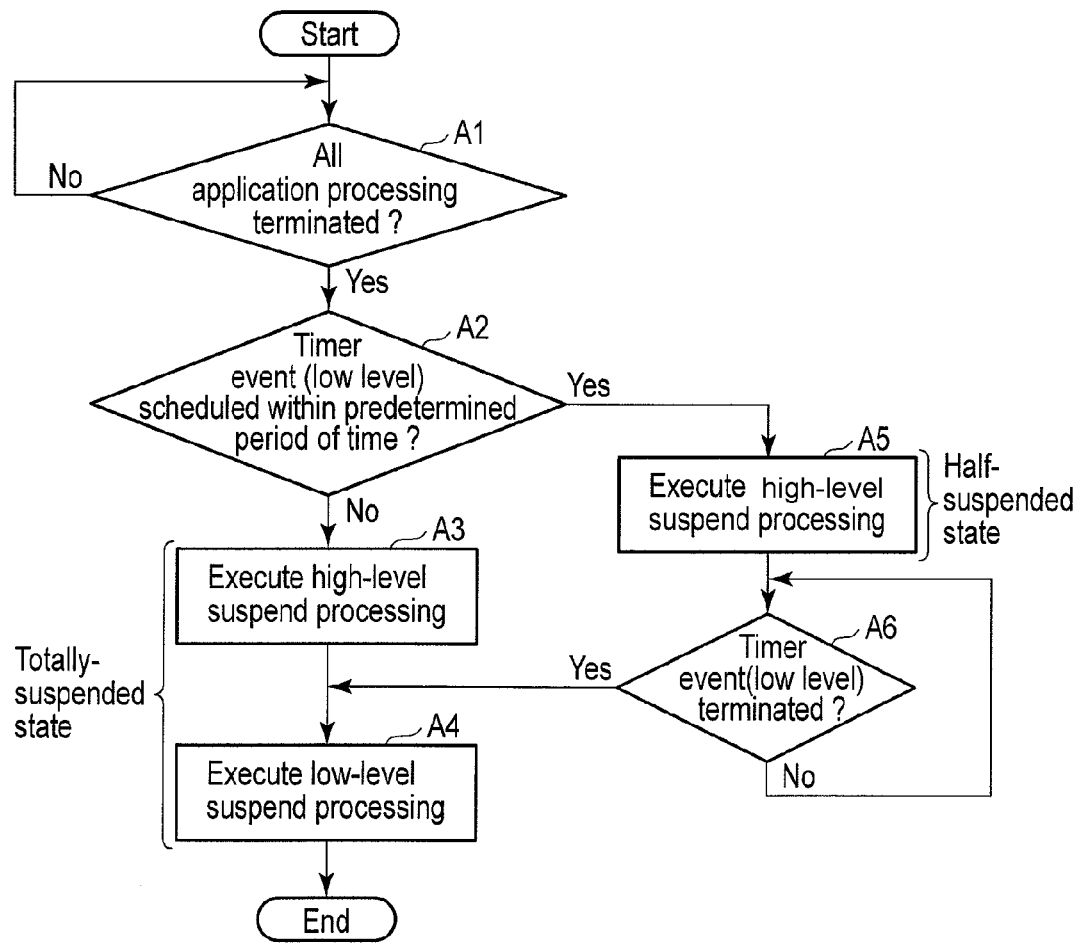
FIG. 7 is an exemplary flowchart illustrating an example of how the suspend processing of the electronic apparatus of the embodiment is executed.

FIG. 7 is an exemplary flowchart illustrating an example of suspend processing of the subject electronic apparatus.

When all application processing is terminated (YES of block A1), the suspend control module 111 of the power control module 11 refers to the timer list 14 and checks whether a timer event of the "low level" is to be executed within a predetermined period of time (block A2).

If the checks shows that there is no such timer event (NO in block A2), the suspend control module 111 executes not only the high-level suspend processing based on the high-level suspend processing module 112 (block A3) but also low-level suspend processing based on the low level suspend processing module 113 (block A4). Thus, the subject electronic apparatus is set in the totally-suspended state.

If the check shows that there is a timer event of the "low level" which is to be executed within the predetermined period of time (YES in block A2), the suspend control module 111 executes only the high-level suspend processing based on the high-level suspend processing module 112 (block A5), and keeps the subject electronic apparatus in the half-suspended state. The suspend control module 111 waits for the timer event of "low level" to be terminated (block A6). When the timer event is terminated (YES in block A6), the suspend control module 111 executes the low-level suspend processing based on the low-level suspend processing module 113 (block A4). Thus, the subject electronic apparatus is switched to the totally-suspended state.

FIG. 8 is an exemplary flowchart illustrating an example of resume processing of the subject electronic apparatus.

When an event that has to be executed in the half-suspended state is generated, the resume control module 114 of the power control module 11 first executes the low-level resume processing based on the low-level resume processing module 116 (block B1). At the time, the resume control module 114 refers to the timer list 14 to check whether a timer event of "high level" is to be executed within a predetermined period of time (block B2).

If the checks shows that such a timer event exists (YES in block B2), the resume control module 114 keeps the subject electronic apparatus in the half-suspended state and waits for the schedule time of the timer event of "high level" to come (block B3). When the schedule time comes (YES in block B3), the resume control module 114 executes the high-level suspend processing based on the high-level suspend processing module 115 (block B4). Thus, the subject electronic apparatus is returned to the operable condition.

If the check shows that there is not a timer event of the "high level" which is to be executed within the predetermined period of time (NO in block B2), the resume control module 114 does not perform any processing. As a result, the low-level suspend processing based on the low-level suspend processing module 113 is executed under the control of the suspend control module 111 (block A4), and the subject electronic apparatus is switched to the totally-suspended state.

As can be seen from the foregoing, the subject electronic apparatus prevents frequent execution of the suspend processing and resume processing.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first power saver configured to switch from an operable condition to a first power saving state;
a second power saver configured to switch from the first power saving state to a second power saving state in which power consumption is smaller than that in the first power saving state; and
a controller configured:
to determine whether a timer event associated with the first power saving state is scheduled within a certain period of time when switching from the operable condition to the second power saving state is required, and
to control the first power saver and the second power saver so as to switch to the first power saving state and maintain the first power saving state without switching to the second power saving state, when the timer event is scheduled within the certain period of time.

2. The apparatus of claim 1, further comprising a timer list storage module configured to store a scheduled time associated with the timer event,
wherein the controller is further configured to compare a present time with the schedule time associated with the timer event stored in the timer list storage module, and to determine, based on a result of comparison, whether processing of the timer event is scheduled within the certain period of time.

3. The apparatus of claim 2, wherein:
the first power saving state comprises a state wherein a running program is aborted; and
the second power saving state comprises a state where power supply to one or more devices is stopped.

4. The apparatus of claim 1, further comprising a setting module configured to enable or disable control performed on the first power saver and the second power saver by the controller in order to maintain the first power saving state when the timer event is scheduled within the certain period of time.

5. The apparatus of claim 4, wherein the setting module is configured to set the certain period of time.

6. The apparatus of claim 1, further comprising:
a first resume processor configured to switch from the first power saving state to the operable condition; and
a second resume processor configured to switch from the second power saving state to the first power saving state,
wherein the controller is configured:
to determine whether a second timer event associated with the operable condition is scheduled within the certain period of time when the second resume processor is controlled to switch to the first power saving state, and
to maintain the first power saving state until a scheduled time associated with the second timer event, and cause the first resume processor to switch to the operable condition when the schedule time of the second timer event comes, if the second timer event exists within the certain period of time.

7. An electronic apparatus comprising:
a first resume processor configured to switch from a first power saving state to an operable condition;
a second resume processor configured to switch from a second power saving state in which power consumption is smaller than that in the first power saving state, to the first power saving state; and
a controller configured:
to determine whether a timer event associated with the operable condition is scheduled within a certain period of time when the second resume processor is caused to switch to the first power saving state, and
to maintain the first power saving state until a schedule time associated with the timer event and cause the first resume processor to switch to the operable condition when the schedule time of the timer event comes, if the timer event exists within the certain period of time.

8. The apparatus of claim 7, further comprising a timer list storage module configured to store a scheduled time associated with the timer event,
wherein the controller is configured to compare a present time with the schedule time associated with the timer event stored in the timer list storage module, and to determine, based on a result of comparison, whether processing of the timer event is scheduled within the certain period of time.

9. The apparatus of claim 7, wherein:
the first power saving state comprises a state where a running program is aborted; and
the second power saving state comprises a state where power supply to one or more devices is stopped.

10. The apparatus of claim 7, further comprising a setting module configured to enable or disable control performed on the first resume processor and the second resume processor by the controller in order to maintain the first power saving state when the timer event is scheduled within the certain period of time.

11. The apparatus of claim 10, wherein the setting module is configured to set the certain period of time.

12. A power saving method for an electronic apparatus that switches among an operable condition, a first power saving state, and a second power saving state in which power consumption is smaller than that in the first power saving state, the method comprising:
determining whether a timer event associated with the first power saving state is scheduled within a certain period of time when switching from the operable condition to the first power saving state is required; and
executing switching to the first power saving state and maintaining the first power saving state without switching to the second power saving state when the timer event exists within the certain period of time.

13. The method of claim 12, further comprising:
determining whether a second timer event associated with the operable condition is scheduled within a certain second period of time when switching from the second power saving state to the first power saving state is executed, maintaining the first power saving state until a schedule time associated with the second timer event, and executing switching to the operable condition when the schedule time of the second timer event comes, if the second timer event exists within the certain period of time.

\* \* \* \* \*